R. E. McCAULEY.
MOLD LOADING DEVICE.
APPLICATION FILED AUG. 28, 1917.

1,281,083.

Patented Oct. 8, 1918.
2 SHEETS—SHEET 1.

WITNESSES
Frederick Diehl.
A. L. Kitchin.

INVENTOR
R. E. McCauley
BY
ATTORNEYS

R. E. McCAULEY.
MOLD LOADING DEVICE.
APPLICATION FILED AUG. 28, 1917.

1,281,083.

Patented Oct. 8, 1918.
2 SHEETS—SHEET 2.

WITNESSES
Frederick Diehl.
A. F. Kitchin.

INVENTOR
R. E. McCauley
BY Munn & Co.
ATTORNEYS

UNITED STATES PATENT OFFICE.

ROBERT E. McCAULEY, OF PITTSBURGH, PENNSYLVANIA.

MOLD-LOADING DEVICE.

1,281,083.　　　　　　Specification of Letters Patent.　　　Patented Oct. 8, 1918.

Application filed August 28, 1917. Serial No. 188,628.

*To all whom it may concern:*

Be it known that I, ROBERT E. MCCAULEY, a citizen of the United States, and a resident of Pittsburgh, in the county of Allegheny and State of Pennsylvania, have invented a new and Improved Mold-Loading Device, of which the following is a full, clear, and exact description.

This invention relates to a device for loading glass molds and has for an object the provision of an improved construction for quickly and easily supplying the proper quantity of glass successively to the molds as they are moved beneath the feeding orifice.

Another object of the invention is to provide an improved construction which will prevent the discharge of the glass except when the device is positively operated.

A further object of the invention is to provide a tubular discharge nozzle normally extending above the level of the glass and means for intermittently reducing the pressure above the discharge nozzle in comparison to the pressure in the tank and feeding extension.

A still further object of the invention is to provide a removable extension for a glass tank or container and an adjustable tubular discharge and regulating member.

Figure 1:
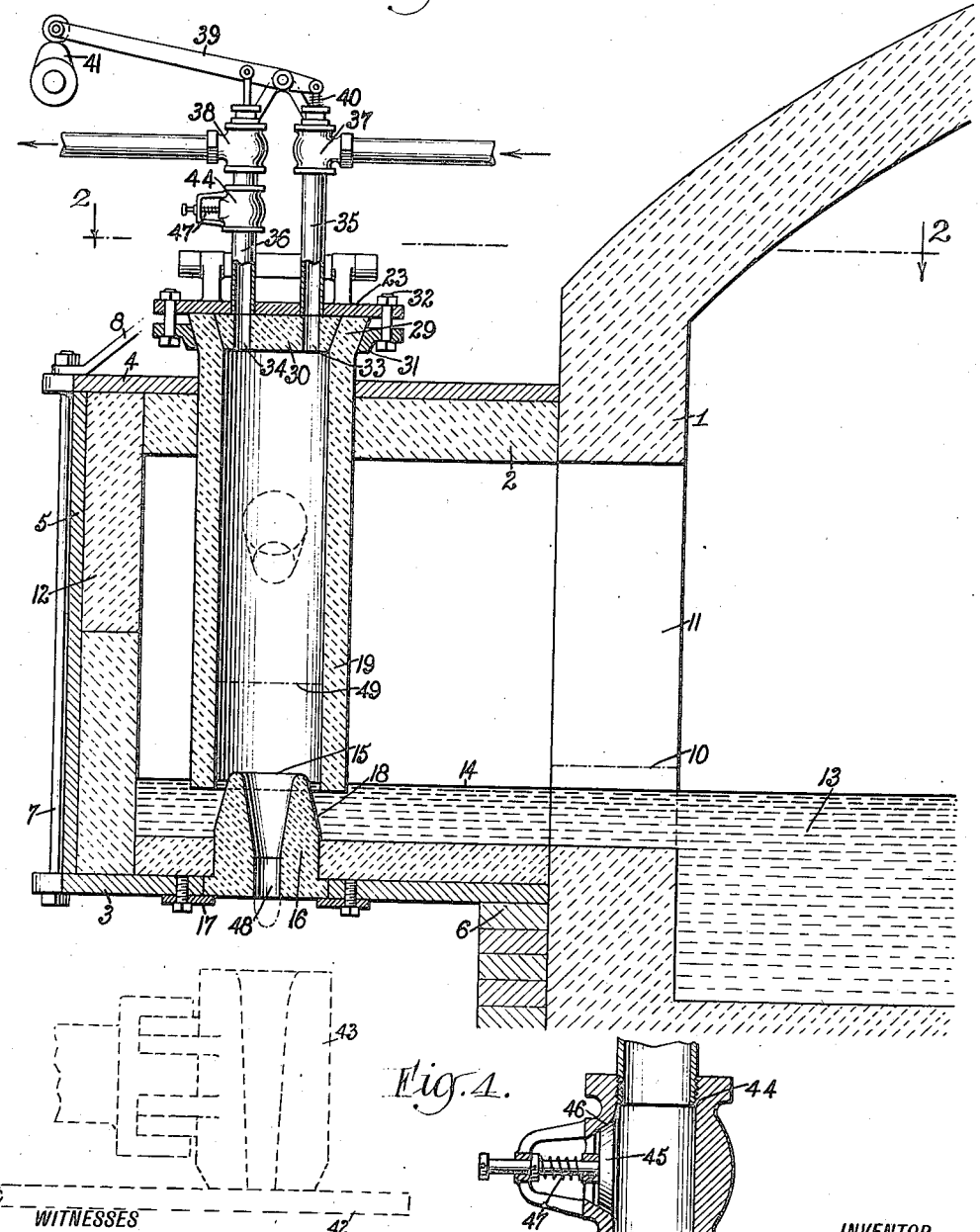
Figure 1 is a longitudinal fragmentary section through part of a glass tank or container, an extension secured thereto, a feeding mechanism arranged on the extension, said extension and feeding mechanism disclosing an embodiment of the invention.
Figure 4:
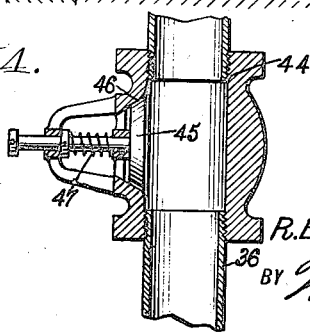
Fig. 4 is an enlarged detail sectional view through a relief valve embodying certain features of the invention.
Figure 2:
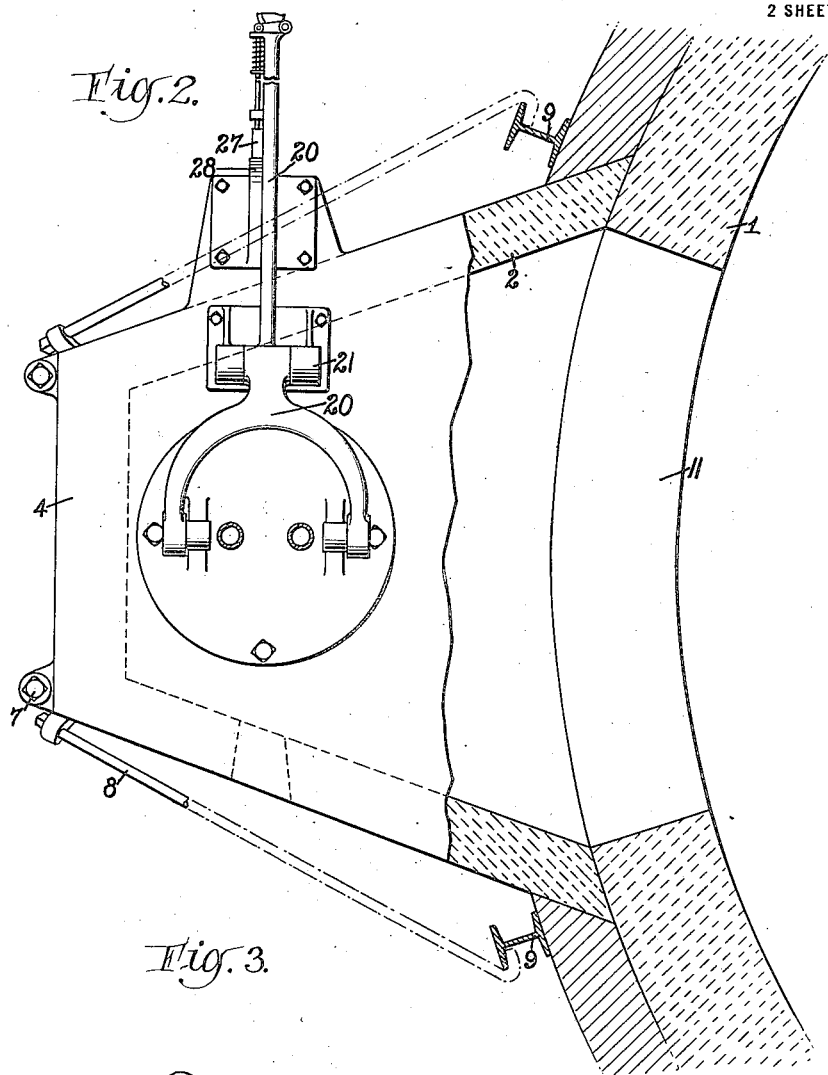
Fig. 2 is a section through Fig. 1 on line 2—2.
Figure 3:
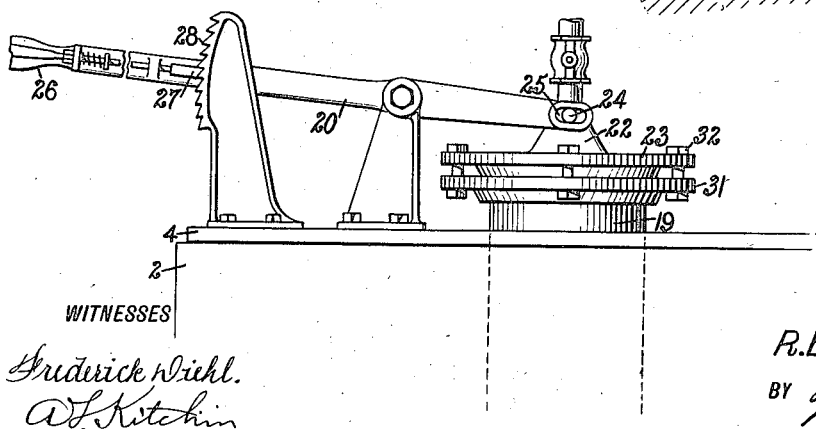
Fig. 3 is a detail fragmentary side view of the upper part of the structure shown in Fig. 2.

Referring to the accompanying drawings by numerals, 1 indicates the main tank to which a removable extension 2 is secured, said extension being made from fire brick or any suitable material and supported by metal plates 3, 4 and 5, said plates being in turn supported by having one end of the plate 3 supported by bricks 6, and the opposite end supported by the rods 7, which rods are in turn properly supported by the guide rods 8, secured in any suitable manner to the reinforcing embracing bars 9 of the main tank 1. The extension 2 may be applied or removed at any time, even when the tank is in operation, by providing a brick 10 temporarily in the opening 11. This brick is removed by tongs or other suitable means through an opening provided by removing a brick 12 in the extension 2, said brick 12 being replaced after the brick 10 has been removed. In using the device the glass 13 is preferably maintained on a level with the line 14 so as to be continuously slightly below the upper edge 15 of the nozzle 16. The nozzle 16 is removably held in place by clamping members 17 and is arranged with a tapering upper end 18 whereby when the tubular feed member 19 is lowered for its full extent no glass will flow into the nozzle 16. The tubular feed member 19 is slidingly fitted in the upper part of the extension 2 as shown in Fig. 1, and it is normally held substantially in the position shown in Fig. 1, though the same may be raised or lowered according to the different circumstances, and as different quantities of glass are required. This upward and downward movement is caused by a yoke lever 20 as shown in Fig. 2, journaled at 21 in the upper plate 4, (Fig. 2), so that as the lever is swung on its pivot the feeding member will be raised or lowered. Brackets 22 are secured to the top plate 23 of the feeding tube 19, and said brackets are provided with pins 24 fitted into slots 25 in the forked end of the lever 20, as shown in Fig. 3. A grip portion 26 of the lever 21 is provided with a spring pressed catch 27 engaging the rack 28 which is secured preferably to the top plate 4. When it is desired to shift the position of the feed member 19 catch 27 is disengaged and the lever 20 is moved pivotally upwardly or downwardly as the case may be, and the catch 27 engaged to hold the feed member at the desired height. This adjustment may be made at any time, even during the operating of the device. The tubular feed member 19 is made from fire brick and is flared at 29, said flare accommodating a sealing plug 30 on the inner face and a clamping arrangement on the outer face, a plurality of bolts 32 causing the ring 31 to clamp the flare 29 and at the same time clamp the top plate 23 in position, said top plate in turn holding the sealing plate 30 in position. If desired packing, fire clay or other suitable means could be used for making the parts tight and more or less heat proof. The sealing cap 30 is provided with apertures 33 and 34, said apertures registering with pipes 35 and 36, pipe 35 being connected to a source of compressed air through valve 37, while pipe 36 is connected to a suction pump through valve 38. These valves are operated by a pivotally mounted arm 39, said arm being urged in one direction by a spring 40 and caused to move in the opposite direction by a cam 41, said cam being timed to move with the turn-table 42, so as to shift the molds 43 automatically with the action of the suction. In connection with the compressed air through pipe 35, it may be noted that the compressed air may be heated or if desired the compressed air could be eliminated and only sufficient air admitted to reduce the rarefaction of the air in the tube 19. The vacuum relief valve 44 is inclosed in the pipe 36, said valve being constructed in any suitable manner, as for instance according to the valve shown in Fig. 4, wherein the movable valve member 45 normally rests on the seat 46 under the action of spring 47. When the suction becomes too great the valve 45 will move away from its seat so as to destroy or reduce the rarefaction. If too great a rarefaction is provided in the tubular feed member 19 the glass would be drawn up to the top of the feed member and in some instances into the pipes 35 and 36, so that in order to positively prevent this the vacuum relief valve 44 is always set to limit the amount of rarefaction.

In operation when the parts are in the position shown in Fig. 2 and the glass is in a liquid state the table 42 and valve 41 and associate parts are in such a position as to open valve 38 whereupon a rarefaction of the air in the feed tube 19 will take place. In starting the device the discharge orifice or passageway 48 of the nozzle 16 must be closed until sufficient plastic glass has flowed into the passageway 48 to form a closure or seal. There remains at all times during the continual intermittent operation of the device sufficient glass to form this seal. After this seal has been formed the orifice is uncovered and if desired a rarefaction or suction may be caused in the feed member 19 which will cause the glass to flow upwardly to substantially the dotted line 49 and as soon as this occurs cam 41 moves beneath the lever 39. This will cut off the suction and allow if desired, a certain quantity of air to enter whereupon the glass will move downwardly through the discharge orifice 48. It is of course understood that the lever 39 could be operated manually as well as automatically. After the device has been started the cam 41 automatically opens the suction valve at the proper time for drawing up a quantity of glass and allowing the same to move down by gravity through the orifice 48. The cam 41 is timed so as to open the valve 38 with a suction substantially at the time the glass is cut-off below the orifice. This will cause the glass, although extending below the orifice, to be drawn or sucked up into the upper part of the nozzle 16, or entirely into the feeding member 19. This will maintain the outflowing glass in the proper liquid state, and will prevent any undue or undesirable chilling. In case the operator instantly stops the machine, or the machine is stopped for any purpose only a limited quantity of glass will flow out, namely part of the quantity that has been previously drawn into a point above line 15 of the discharge nozzle 16. After this glass has been discharged no additional glass will be discharged by reason of the fact that the upper end of the nozzle 16 is above the level of glass 13. This is also an advantage in that it does not require the plugging up of the orifice 48 when the machine is stopped. It will be evident that the nozzle 16 may be renewed at any time and that the same may be made of any desired length so as to take care of any depth of glass.

What I claim is:

1. In a glass molding machine of the character described, a supply tank, a tubular feeding and regulating member, means for producing a rarefaction therein, and a discharge nozzle arranged in line with said tubular feed member and projecting to a point above the upper surface of the glass in said tank.

2. A molding device comprising a discharge nozzle, means for guiding molten glass so as to surround said nozzle, and means utilizing difference in air pressure for causing the glass to flow intermittently upwardly over the outside of said nozzle and then downwardly through the nozzle.

3. A molding device of the character described comprising a discharge nozzle, means for guiding molten glass to the discharge nozzle, said discharge nozzle projecting above the upper level of said glass, a tubular member arranged in axial alinement with said nozzle and positioned so that the lower end will be submerged in said molten glass, and means for intermittently rarefying the air in said tubular member.

4. In a mold loading device of the character described in combination with a supply tank, an extension fitted thereon, a discharge nozzle extending through the bottom of said extension to a point above the upper level of the glass therein, a tubular member arranged in axial alinement with said nozzle and of a size to telescope thereover, means for adjusting the position of said tubular member axially so that the lower end thereof may be positioned at any desired point along the upper part of said nozzle, and means for intermittently rarefying the air in said tubular member.

5. In a molding device of the character described in combination with a supply member having a certain level of glass arranged therein, a nozzle extending through the bottom of said supply member and upward to a point above the upper level of said glass, and means for intermittently causing the glass to move upward and then downward into and through said nozzle.

6. In a mold loading device of the character described the combination with a glass supply member having a predetermined level of molten glass therein, of a nozzle extending upwardly through the bottom of said supply member to a point above the level of glass therein, said nozzle having an aperture through which the glass flows when the device is in operation, and means for causing an intermittent flow of glass through said nozzle.

7. In a mold loading device of the character described the combination with a supply member provided with an aperture in the bottom, of a nozzle connected with the bottom and extending to a point sufficiently above the bottom to be above the upper surface of the glass in said supply member, said nozzle directing the glass through said aperture and tubular member arranged above said nozzle when positioned with the lower end submerged in said glass, and means for producing an intermittent rarefaction in said tubular member for intermittently drawing up a quantity of glass above said nozzle and then allowing the glass to fall by gravity into and through the nozzle.

8. A mold loading device of the character described comprising a supply member having an aperture therein, an adjustable tubular member arranged in line with and above said aperture, said tubular member having a flaring upper end, a ring fitted around the upper surface of said flaring upper end and conforming to the shape thereof, a plate fitted across said upper end, bolts for securing said ring and said plate and at the same time clamping the said tubular member to said plate, means acting on said plate for raising or lowering said tubular member, and means for providing intermittent rarefaction in said tubular member.

9. A mold loading device for molten glass comprising a supply member having an aperture therein, a nozzle projecting upwardly through said aperture, a tubular member spaced permanently above and in line with the aperture, means for supplying suction to said tubular member for producing a vacuum therein for drawing glass to a point above said nozzle, and a vacuum relief valve for relieving the rarefaction in the tubular member, whereby the glass drawn into said tubular member may flow downwardly through said nozzle.

10. A mold loading device of the character described comprising a supply member having an aperture therein, a nozzle fitted into said aperture and extending a sufficient distance above the bottom of the supply member to cause the upper edge thereof to be above the surface of the glass in the supply member, a tubular member capable of telescoping around the nozzle and arranged above the nozzle, means for moving said tubular member toward and from said nozzle, and means for intermittently producing a rarefaction in said tubular member.

11. A mold loading device of the character described comprising a supply member having an aperture therein, a nozzle fitted in said aperture and extending a sufficient distance into said supply member to have the upper edge thereof above the glass in the supply member, the upper part of the nozzle tapering, a tubular member arranged above said nozzle and formed with a bore of substantially the same diameter as the nozzle near the lower end of the taper, means for adjusting the position of said tubular member toward and from said nozzle whereby the space between the tubular member and nozzle is varied for controlling the flow of glass into the tubular member and from thence into the nozzle, and means for intermittently rarefying the air in said tubular member.

ROBERT E. McCAULEY.